United States Patent [19]
Jansson et al.

[11] Patent Number: 4,625,403
[45] Date of Patent: Dec. 2, 1986

[54] DEVICE FOR GRASPING AND HANDLING ARTICLES

[76] Inventors: Jörgen Jansson, Ulfsta Idenor, 824 00 Hudiksvall; Lars Jansson, Ulfsta Idenor, 820 00 Hudiksvall, both of Sweden

[21] Appl. No.: 774,403

[22] Filed: Aug. 30, 1985

[30] Foreign Application Priority Data

Sep. 7, 1984 [SE] Sweden ................................ 8404496

[51] Int. Cl.[4] ................................................ A21C 15/04

[52] U.S. Cl. ......................................... 30/114; 30/124; 294/7

[58] Field of Search ....................... 30/114, 124; 294/7, 294/1.1; 7/113

[56] References Cited

U.S. PATENT DOCUMENTS

| | | | |
|---|---|---|---|
| 2,264,486 | 12/1941 | Smith et al. | 30/114 |
| 2,555,690 | 6/1951 | Guerra | 30/114 |
| 2,600,646 | 6/1952 | Haugland | 30/114 |
| 2,841,868 | 7/1958 | O'Brien | 30/114 |
| 3,376,639 | 4/1968 | Pompini | 30/124 |
| 3,888,001 | 6/1975 | Gilbart-Smith | 30/114 |
| 4,346,927 | 8/1982 | Karg | 294/7 |

FOREIGN PATENT DOCUMENTS

| | | | |
|---|---|---|---|
| 57287 | 2/1940 | Denmark | 30/114 |

*Primary Examiner*—Jimmy C. Peters
*Attorney, Agent, or Firm*—Gifford, Groh, VanOphem, Sheridan, Sprinkle & Dolgorukov

[57] ABSTRACT

A device for grasping and handling generally cylinder sector shaped articles such as pieces of cake or the like, comprises two blade parts (1, 2) and a grip (8, 9) located at one end of these blades. The two blade parts (1, 2) are pivotably connected with each other by means of a hinge (4) located at that end of the blade parts which is opposite to the grip (8, 9).

10 Claims, 8 Drawing Figures

DEVICE FOR GRASPING AND HANDLING ARTICLES

FIELD OF INVENTION AND PRIOR ART

The invention relates to a device for grasping and handling articles, primarily generally cylinder sector shaped articles, such as pieces of cake, comprising two blade parts and a grip located at one end thereof, said blade parts being pivotally connected to each other by means of a hinge located at that end of the blade parts which is opposite to the grip to enable grasping of the article in question between each other. The cylinder sector shaped articles are in practice constituted of parts of food products. The food products in question are cylinder shaped and may for example be constituted of cakes, cheese etc. The parts receive the cylinder sector shape when cut out from the food products since such technique of cutting out in general means the most rational division of the food products in smaller parts.

Devices of the kind defined by way of introduction is known by the CH-patent 573 728 and the U.S. Pat. No. 2,264,486. With these devices pieces of cake cannot always be satisfactorily cut, in any case not with such a precision which often is aimed at, since the two required cuts must be performed simultaneously. This depends on that the blade parts compulsory will be located at a large mutual distance, as a consequence of the design of the grips or portions connecting these with the blade parts. If the cake, which shall be cut, is very low or else has a loose consistence the design of the known devices leads to that they cannot be used. Thus, one will be directed to use a conventional cake slice.

BRIEF DESCRIPTION OF THE INVENTION

The object of the invention is to reduce the above defined draw backs and to achieve a device with a, as far as possible, universal utility for all kinds of cakes or other food products.

This object is obtained according to the invention by the circumstances appearing from the following claims. Since the device according to the invention can be brought in a position where its both blade parts can operate as one single cutting blade the device can on one hand be used in a way similar to a conventional cake slice, and on the other hand for grasping the article in question between the two blade parts. Thus, one can with one and the same device perform all necessary cutting, grasping and movement operations in connection with articles of highly different character.

Further features and advantages of the device according to the invention appear below.

BRIEF DESCRIPTION OF THE DRAWINGS

Referring to the appended drawings, below follows a close description of embodiments of the invention, cited as examples, in which.

DETAILED DESCRIPTION OF PREFERRED EMBODIMENTS

Figure 1:
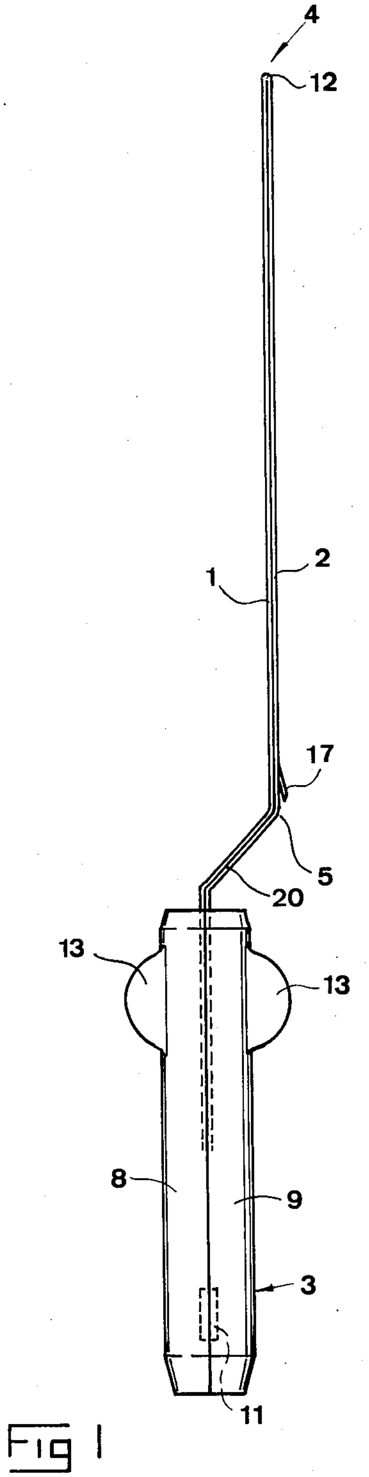
FIG. 1 is a side view of the device according to the invention.

The device according to the invention will below be described as specially intended for grasping and handling substantially cylinder sector shaped articles in form of pieces of cake.

The device comprises two blade parts 1, 2 and a grip located at one end thereof generally denoted with 3. The two blade parts 1 and 2 are pivotally connected with each other by means of a hinge 4 located at that end of the blade parts 1, 2 which is opposite the grip 3. The grip 3 and the hinge 4 are in the exemplified embodiment located at diametrically opposite ends of the device, which here is illustrated as relatively elongated, but which in practice could be substantially shorter and wider.

The blade parts 1 and 2 are pivotable about the hinge 4 in a direction towards each other to a position (FIG. 1) where they lie close to each other or against each other in a substantially parallel condition. As appears from FIG. 1, the intention is that the blade parts 1 and 2 in this position shall form a totally flat and relatively thin disc like structure. In the example the blade parts 1 and 2 comprise bends 5 in the vicinity of the grip but these are intended to be located outwardly of the portions of the blades parts 1, 2, which normally come into contact with pieces of cake. The hinge 4 is intended to form a geometric pivot axis, which extends substantially perpendicularly to the longitudinal direction of the device and parallel with the plane of the blade parts 1, 2.

It is preferred that the blade parts 1, 2 is designed with a cutting edge 7 along at least one edge (see the edge 6 in FIG. 2), said cutting edge may possibly be cogged. It is then meant that the cutting edges 7 on the two blade parts 1 and 2 are so designed that the cutting edges cooperate for forming one single main cutting edge, when the two blade parts 1 and 2 are pivoted towards each other. When the blade parts 1 and 2 are pivoted towards each other to the position according to FIG. 1 the device thus can in a conventional way be used for cutting for instance a piece of cake out of a cake.

Figure 8:
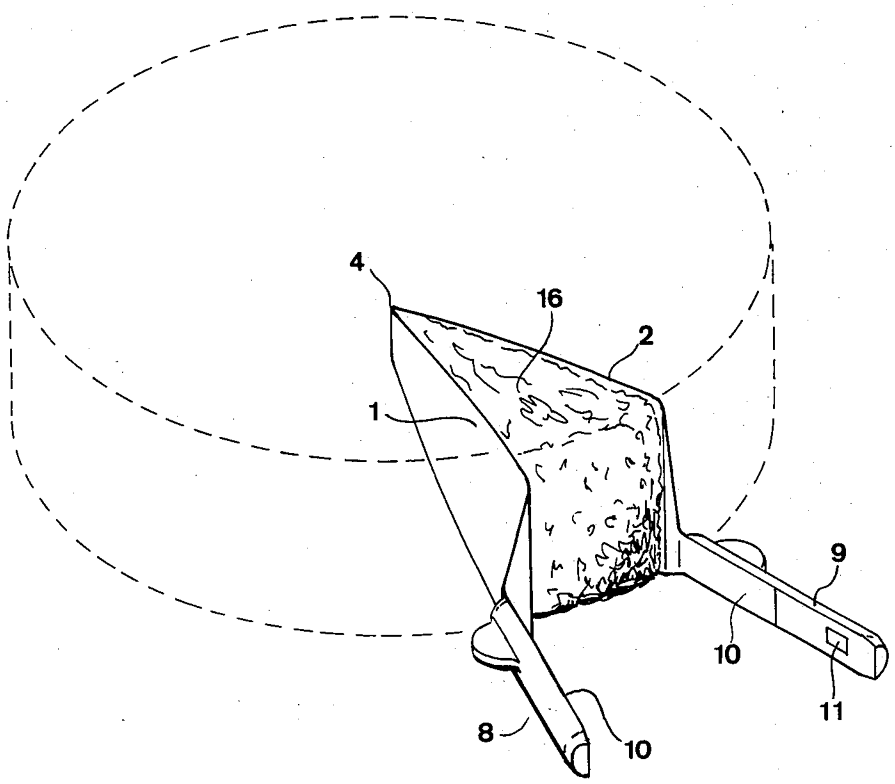
FIG. 8 is a perspective view illustrating the device in operation.

The grip is in the example formed by two gripping members 8, 9, one of which is arranged on the blade part 1 while the other 9 is arranged on the blade part 2. The gripping members 8 and 9 are each separately operable as a grip when the blade parts 1 and 2 are pivoted away from each other (FIG. 8). On the other hand the gripping members 8 and 9 are so designed that the jointly form one single grip 3, which can be grasped by one hand when the blade parts 1, 2 are pivoted towards each other to the position according to FIGS. 1 and 2. As appears from FIG. 8 the surfaces 10 of the gripping members 8 and 9, which are facing towards each other, can in practice be flat to enable a close application against each other analogically to the way in which the blade parts 1 and 2 are applicable against each other.

The device presents means 11 for holding together the blade parts 1 and 2 in their condition pivoted towards each other. Said holding means could be arranged to operate on basis of magnetism. As an alternative the holding means could be designed to operate by mecanical engagement. Such mecanical holding means could as an example consist of snap locking means releasable by actuation of a certain force in a direction away from each other or locking means releasable by loosening of a form locking connection. It is suitable to arrange the holding means 11 in the area of the grip 3, preferably so that one means is arranged on each of the gripping members 8 and 9 so that these two means enter into a co-operation holding the gripping members together when they are moved towards each other.

Figure 2:
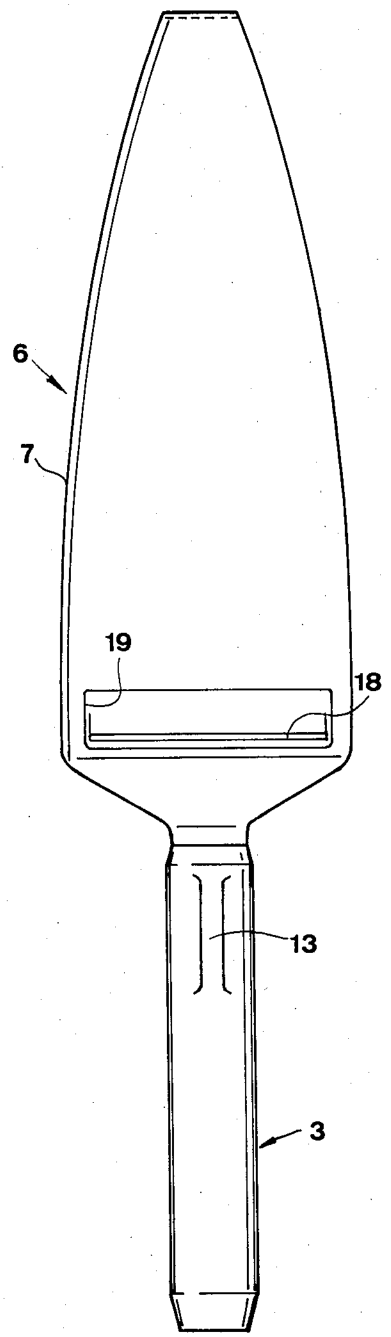
FIG. 2 is a plane view of the device.

For the purpose of obtaining that the blade parts 1 and 2 are lying relatively close to each other in the folded condition according to FIG. 1, it is recommendable to design the blade parts 1 and 2 in such a way that they, apart from the area of the hinge 4, not really are deformed during normal use of the device. The flat shape of the blade parts 1 and 2 shall thus as far as possible be maintained.

It would be possible to design the hinge of a flexible material portion 12. This material portion 12 should then allow pivoting of the blade parts 1 and 2 towards and away from each other by elastic deformation of the material in the portion 12. It is then preferred that the blade parts 1 and 2 are manufactured in one single material piece and that the flexible material piece 12 forms a transition between the blade parts 1 and 2. The material portion 12 will thereby form a diversion of substantially 180 degrees of the material piece which forms the blade parts 1 and 2. The arrangement can then be such that the elasticity of the material portion 12 tends to actuate the blade parts 1 and 2 to pivot in the direction towards each other to the position according to FIG. 1. For the purpose of bringing the blade parts 1 and 2 and the gripping members 8 and 9 in a direction away from each other one should thus have to exert separating forces. It could then be preferable to apply gripping abutments 13 on the gripping members 8 and 9, which can be grasped between the thumb and one of the rest of the fingers of the hand and which are located on the sides of the gripping members 8 and 9 which are facing away from each other.

Figure 3:
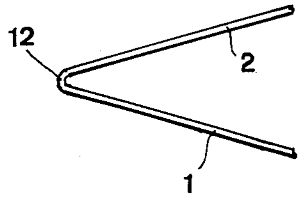
FIG. 3 is a detailed view illustrating a hinge comprised in the device.

According to an alternative embodiment the flexible material portion 12 could instead be arranged to tend to actuate the blade parts 1 and 2 to a position (FIG. 3) where they are pivoted away from each other. To obtain the position according to FIG. 1 one should thus have to actuate the gripping members 8 and 9 in a direction towards each other by the hand.

A material piece forming the blade parts 1 and 2 and the material portion 12 may be constituted of metal as well as plastic.

Figure 4:
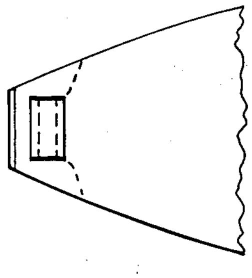
FIGS. 4 and 5 are views from the side and from above respectively, illustrating an alternative embodiment of the hinge.
Figure 5:
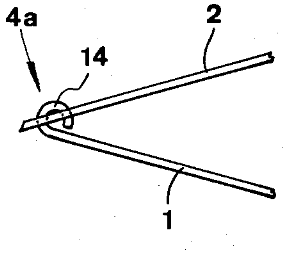

In FIGS. 4 and 5 an embodiment is illustrated where a hinge 4A has not been formed by a flexible material portion but instead by a portion of the one blade part 1, bent to an eye 14, surrounding a portion of the other blade part 2. In case one, in this embodiment, desires any inherent tendency to actuation of the blade parts 1 and 2 in a direction towards or away from each other, an arrangement of one or several spring means in a way known per se is required.

Figure 6:
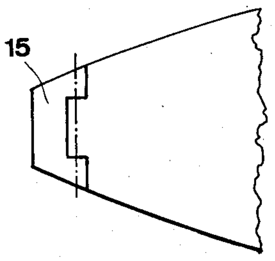
FIGS. 6 and 7 are views from the side and from above respectively, of an additional alternative embodiment of the hinge.
Figure 7:
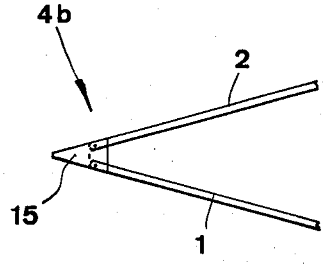

In the embodiment shown in FIGS. 6 and 7 the hinge 4B has been formed by means of a piece 15, which connects the blade parts 1 and 2 in that the piece 15 is pivotally connected to each one of the blade parts.

When using the device according to the invention it can in a position according to FIG. 1 be used as a conventional cutting device for cutting a cylinder sector shaped piece of cake indicated in FIG. 8 with 16 out of a cylindrical cake. When the cut out has been completed the user can by moving the gripping members 8 and 9 apart from each other and grasping one of the gripping members with one hand and the other gripping member with the other hand, apply the device about the piece of cake 16 so that the situation in FIG. 8 is obtained. The user has then to see to it that the space between the blade parts 1 and 2 will be of a size corresponding to the piece of cake. Further the blade parts 1 and 2 should of course be brought down in the previously formed cuts at the same time as the hinge should be located at the tip of the piece of cake 16. When the piece of cake 16 now shall be lifted out of the cake the user applies such force on the gripping members 8 and 9 that the blade parts 1 and 2 are actuated in a direction towards each other in an extension sufficient for maintaining a secure holding of the piece of cake 16 between the blade parts 1 and 2. The user can then securely lift the piece of cake and place the same on a plate without any risk for the piece of cake to unintentionally fall during the movement operation. The engagement between the large surfaces of the blade parts 1 and 2 and the sides of the piece of cake is causing that a relatively small actuation of the blade parts in the direction towards each other is required for achieving a secure grip of the piece of cake.

Above it has been described in detail how the device is used in connection with cakes. It is however obvious that the device may be used for grasping and handling and possibly also cutting out other cylinder sector shaped articles than pieces of cake.

Even if the device is mainly designed for cylinder sector shaped articles it can also be used for articles with other shapes. However, special advantages occur when the articles have a narrowing shape.

In a preferred embodiment the one blade part 2 of the device (FIGS. 1 and 2) could be provided with a lip 17 punched downwardly for making the device to operate as a planer for cheese or the like. By the punching downwardly of the lip 17 a hole 18 is obtained in the blade part 2 and a further hole 19 is arranged in the blade part 1, said holes allow passing through of the planed slice.

We claim:

1. A device for grasping and handling articles, primarily generally cylinder sector shaped articles such as pieces of cake, comprising two blade parts (1, 2) and a grip (3) located at one end thereof, said blade parts (1, 2) being pivotally connected to each other by means of a hinge (4) located at that end of the blade parts which is opposite to the grip (3) to enable grasping of the article in question between each other, characterized in that the blade parts (1, 2) are pivotable in a direction towards each other without any obstruction by the grip or other components of the device to a position (FIG. 1), where they lie in close vicinity to each other in a substantially parallel relation so as to thereby co-operate so that they operate as one single cutting blade.

2. A device according to claim 1, characterized in that the blade parts (1, 2) are formed with a cutting edge (7) at least along one edge (6) and that these cutting edges (7) are so constituted that they co-operate for forming one single main cutting edge, when the blade parts are pivoted toward each other.

3. A device according to claim 1, characterized in that the grip is formed by two gripping members (8, 9), which are arranged on the two blade parts (1, 2) and which each separately is on one hand operable as a grip when the blade parts are pivoted away from each other and which jointly on the other hand form one single grip which can be grasped by one hand when the blade parts are pivoted towards each other.

4. A device according to claim 1, characterized in that the device is provided with means (11) for holding the blade parts (1, 2) together in their position pivoted towards each other.

5. A device according to claim 1, characterized in that the hinge (4) is formed by a flexible material portion (12).

6. A device according to claim 5, characterized in that the blade parts (1, 2) are constituted of one material piece and that the flexible material portion (12) forms a transition between the blade parts.

7. A device according to claim 1, characterized by an arrangement for actuating the blade parts (1, 2) in a direction towards each other or to a position where they are pivoted away from each other.

8. A device according to claim 7, characterized in that said hinge (4) is formed by a flexible material portion (12), and in that the actuating arrangement is constituted of the flexible material portion (12).

9. A device according to claim 3, characterized in that the balde parts (1, 2) each comprises a bend (5) in the vicinity of the gripping members (8, 9) but outwardly of their areas which normally come into contact with the article, so that the grip is displaced away from the plane in which the blade parts are located (FIG. 1), in the brought together condition of the blade parts, and that portions (20), which are extending obliquely from these bends in a direction towards the gripping members of the blade parts, are located in close vicinity to each other in a parallel condition, when the blade parts are pivoted towards each other.

10. A device according to claim 1, characterized in that one blade part (2) of the device presents a plane edge (17) for making the device to operate as a planer for cheese etc, that a first hole (18) is formed in the blade part (2), presenting the plane edge, in connection to the plane edge, and that an additional hole (19) is formed in the other blade part (1), said two holes allowing passing through of a slice planed by the plane edge.

* * * * *